United States Patent [19]

Underwood

[11] Patent Number: 5,008,011
[45] Date of Patent: Apr. 16, 1991

[54] SHOWER DECHLORINATOR USING GRANULATED COPPER ALLOY FILTER MATERIAL

[76] Inventor: David T. Underwood, 1239 E. Brentrup, Tempe, Ariz. 85283

[21] Appl. No.: 424,823

[22] Filed: Oct. 20, 1989

[51] Int. Cl.$^5$ .................. E03C 1/08; B01D 27/02
[52] U.S. Cl. ........................ 210/232; 4/615; 210/266; 210/282; 210/449; 210/503; 210/505
[58] Field of Search ............... 4/596, 597, 615; 210/266, 282, 449, 459, 460, 500.25, 503, 505, 508, 295, 232, 263, 500.1

[56] References Cited

U.S. PATENT DOCUMENTS

| | | | |
|---|---|---|---|
| 2,582,388 | 1/1952 | Mansfield | 210/266 |
| 3,760,951 | 9/1973 | Mansfield | 210/460 |
| 4,678,571 | 7/1987 | Hosaka et al. | 210/266 |
| 4,732,674 | 3/1988 | Tamura et al. | 210/282 |
| 4,911,840 | 3/1990 | Underwood | 210/449 |
| 4,933,080 | 6/1990 | Rundzaitis et al. | 4/615 |

FOREIGN PATENT DOCUMENTS

| | | | |
|---|---|---|---|
| 2100281 | 7/1972 | Fed. Rep. of Germany | 210/449 |
| 2480822 | 10/1981 | France | 4/615 |
| 197291 | 10/1985 | Japan | 210/505 |
| 2289211 | 12/1987 | Japan | 210/500.25 |
| 661306 | 7/1987 | Switzerland | 4/615 |

Primary Examiner—Robert A. Dawson
Assistant Examiner—Joseph Drodge
Attorney, Agent, or Firm—LaValle D. Ptak

[57] ABSTRACT

A shower dechlorinator is fabricated in the form of a short cylindrical filter housing. A first end cap is provided on one end of the housing, and this end cap is threaded onto the outlet pipe for a shower. A second end cap seals the other end of the housing and is adapted to be attached to a shower head. The filter housing is filled with granulated or randomly oriented fibrous material which chemically interacts with chlorine in the water passing through the unit. Typical filter material is in the form of a copper/zinc metal alloy.

15 Claims, 1 Drawing Sheet

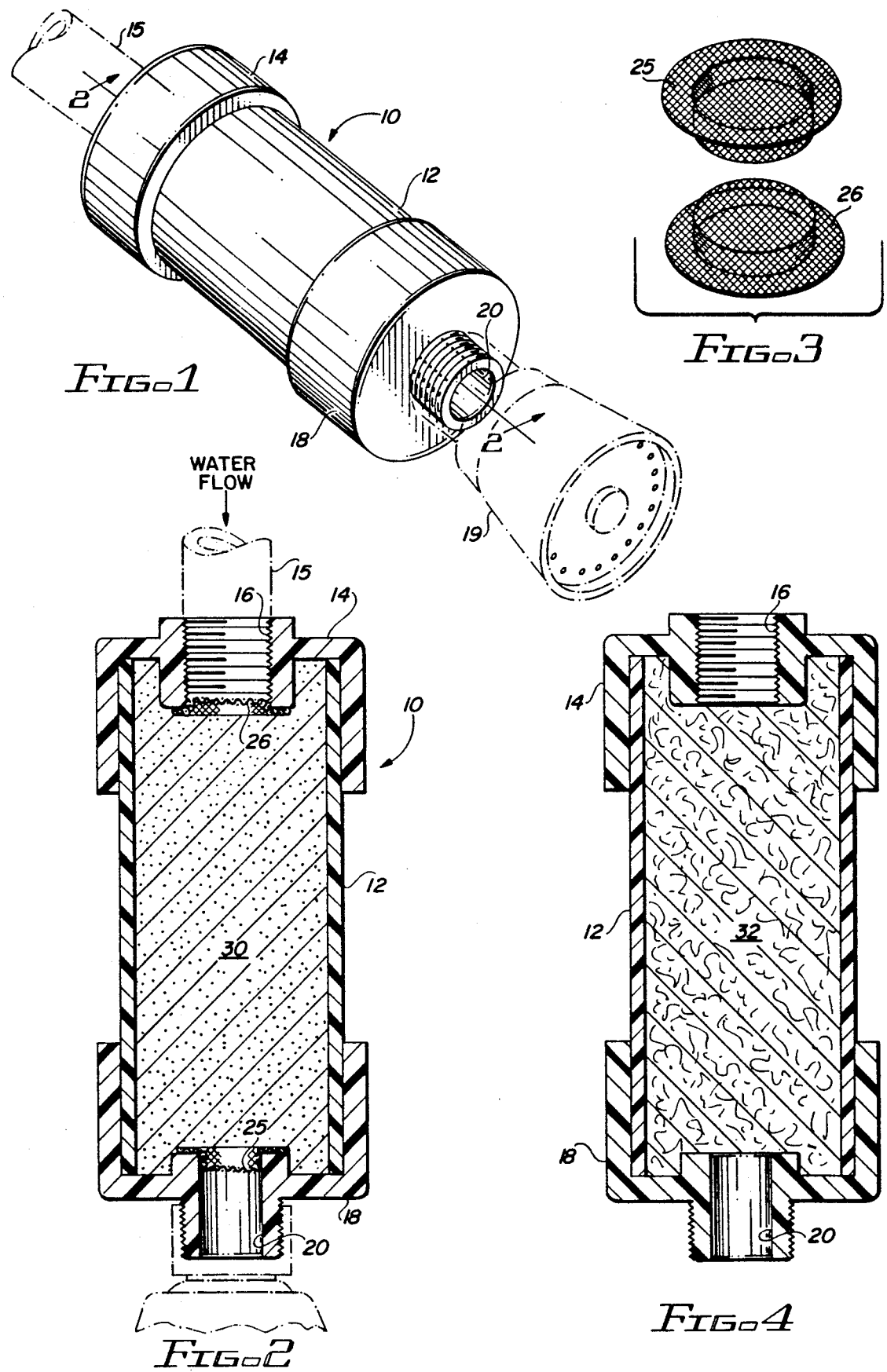

ent of the invention;
SHOWER DECHLORINATOR USING GRANULATED COPPER ALLOY FILTER MATERIAL

BACKGROUND

Over the past several years substantial concern has been exhibited over the quality of water supplies in all areas of the United States and in other countries of the world. All sources of water, including ground water supplies, are becoming increasingly polluted. A variety of different techniques are employed to purify such water, so that it can be used for drinking, cooking and bathing purposes.

A primary purification chemical, widely used in the United States, is chlorine. As water supplies become increasingly polluted, increasing amounts of chlorine are added to such water supplies to purify the water. Chlorine and its derivitives are used by water companies because of the significant effectiveness of chlorine in killing micro-organisms. It is well known that chlorine attacks organic matter, making chlorine a potent bleaching agent. Common household bleaches frequently are chlorine based.

Although chlorine is effective in purifying water, it also is very hazardous. Even diluted chlorine must be used with care. As increasing amounts of chlorine are used in drinking water, the taste and odor of such drinking water are significantly adversely affected. Consequently, many drinking water filter units currently are marketed for removing chlorine, and other contaminants, from drinking water at the point of delivery through the taps of homes and businesses. Such filters generally are relatively bulky in size, but usually they are located under the sink in a storage cabinet, so that they are out of sight.

Chlorine usually is not removed from the primary water supply used throughout the home. Thus, the water which is delivered to the laundry room and to the bathrooms contains relatively large amounts of chlorine. Consequently, the water which is delivered to the bathtub faucets and showers typically contains chlorine where it is inhaled and absorbed by the skin. As mentioned above, chlorine attacks organic matter. Consequently, chlorine applied to the skin and hair chemically bonds with the protein present. Chlorine tends to make hair brittle and dry; and it makes sensitive skin dry, flaky, and itchy.

It is desirable to provide a simple, inexpensive and effective device for removing chlorine from the water supply used for bathing.

SUMMARY OF THE INVENTION

It is an object of this invention to provide an improved filter for removing chlorine from a water supply.

It is another object of this invention to provide an improved shower dechlorinator.

It is an additional object of this invention to provide an improved, small, efficient in-line dechlorinator unit.

It is a further object of this invention to provide an improved, small, dechlorinator filter unit utilizing electrochemical reaction to convert the chlorine to water soluable metal chlorides which are harmless to the skin.

It is yet another object to provide a dechlorinator unit that will not clog, or remove and capture sediment, thus extending its high flow capabilities.

In accordance with a preferred embodiment of this invention, a dechlorinator unit for showers and the like includes a housing, closed at opposite ends by first and second end caps. One of the end caps attaches to a water supply to supply water to the housing, and the other end cap is connected to a device for delivering water from the housing. A chlorine removal filter material in the form of a copper-zinc alloy, substantially fills the housing to electro-chemically react with the chlorine to remove it from the water supplied from the dechlorinator unit.

BRIEF DESCRIPTION OF THE DRAWING

FIG. 1 is a perspective view of a preferred embodiment of the invention;

FIG. 2 is a cross-sectional view taken along the line 2—2 of the embodiment of FIG. 1;

FIG. 3 is a detail of two of the parts used in the embodiment of FIG. 2; and

FIG. 4 is a cross-sectional view similar to the view of FIG. 2, but illustrating an alternative embodiment of the invention.

DETAILED DESCRIPTION

Reference now should be made to the drawing in which the same reference numbers are used throughout the different figures to designate the same components.

The dechlorinator unit which is illustrated in FIG. 1 comprises a main body portion 12 in the form of a hollow plastic cylinder, typically approximately eight inches (8") long and two to two and one-half inches (2"-2½") in diameter. A material which has been found suitable for the housing 12 is rigid PVC plastic, but other materials also may be used. The housing is closed on opposite ends by PVC end caps 14 and 18, as illustrated in FIGS. 1, 2, and 4. These end caps are bonded to the main body portion 12 in any suitable, conventional manner.

The end cap 14 has a short, hollow, internally threaded cylindrical opening 16 in it. The opening 16 is dimensioned to thread onto a typical standard externally threaded shower pipe 15, which is commonly used throughout the United States and other countries.

The opposite end of the housing 12, which is closed by the cap 18, has a short, hollow, externally threaded projection 20 extending from it in the center of the cap 18. The opening through the projection 20 is substantially the same size as the internal diameter of the pipe 15 to which the threaded portion 16 is attached. The external threads on the projection 20 are the same as those normally provided on the end of the pipe 15, so that a shower head 19 of the type usually attached directly to the end of the pipe 15 may be threaded onto the projection 20, as illustrated in FIGS. 1 and 2.

As illustrated in FIG. 2, a filter material in the form of fine particles of copper-zinc alloy 30 fills the housing 12. The openings through the center of the portion 16 and the inside of the projection 20 are provided with filter screens 26 and 25, respectively. The mesh size of the screens 25 and 26 is selected to be smaller than the particle size of the filter material 30 to prevent the filter material from being washed out of the unit when it is in use. A typical mesh size is 60 mesh, but obviously this size can be varied in accordance with the finest particle size of the filter material 30 which is used.

The screens 25 and 26 include a circular slightly dome-shaped portion extending from an outwardly flared flange. They resemble little "hats", as is most apparent from FIG. 3. The screens 25 and 26 are installed by pressing them into the openings in the portion 16 and projection 20, with the flanges overlying the edges of the openings, as illustrated in FIG. 2. When the housing 12 is filled with filter material 30, the screen member 25 is pressed into the end of the opening through the projection 20 and is held in place by the flange. Because the screens 25 and 26 are somewhat domed, a convex surface of the screen 26 is presented to waterflow passing from the pipe 15 into the unit 10. This creates a slight pressure against the convex surface of the screen 26, causing an outward force about its periphery to cause it to more tightly engage the internally threaded surface of the portion 16 in the cap 14. Consequently, the screens 25 and 26 remain in place and prevent the filter material 30 from being washed out of the housing 12. In addition, the screen 26, shown in FIG. 2, acts to block large sediment particles in the water supply from passing into the dechlorinator unit and on to the shower head 19. However, the much smaller sediment particles pass through. Since the sediment particles in the water are permitted to pass through the filter to the shower head 19, the high water flow rates required for a shower are possible.

FIG. 4 shows an alternative embodiment of the invention. This embodiment essentially is structurally the same as the one shown in FIG. 2. In the embodiment of FIG. 4, however, the filter screens 25 and 26 are not used. In addition, the filter material 32 no longer is a granulated metal oxide, but instead is made of elongated randomly oriented metal fibers of a copper-zinc alloy in the form which typically is widely used in "steel wool" abrasive pads. This results in random, tightly packed metallic threads of the copper-zinc alloy filling the housing 12. Since this material cannot be washed out of the housing 12, the screens 25 and 26 are not necessary. The electro-chemical reaction of the water with the filter material 32, however, is the same with the embodiment of FIG. 4, as it is in the embodiment of FIG. 2. The filter material 32 is tightly packed to maximize the effectiveness of the filtering reaction.

A primary requirement of the dechlorinator 10 which is shown in the drawing and described above, is that a relatively high water flow rate is necessary (typically, two to three gallons per minute). In addition the unit must be of a relatively small size, but have the capability of treating a large volume of water.

Activated carbon is widely used to remove chlorine and other contaminants from drinking water systems, but activated carbon reaches a saturation point relatively quickly (typically only hundreds of gallons of water treated). In addition, most carbon filter materials deteriorate in hot water. Consequently, activated carbon is not a suitable material for the filter which has been described.

The utilization of a copper-zinc alloy, which because of the dissimilar metals principle, causes spontaneous oxidation-reduction reactions between the filter material and free chlorine residuals. This material has been found to be highly effective for a high water flow rate through a relatively small container with the capability of treating thousands of gallons of water, not just hundreds of gallons. When water flows through the filter described above, the free chlorine is converted to water soluable zinc chloride, which is harmless. It also is believed that zinc has the benefit of being a nutrient for the skin. The filter material itself is non-toxic and bacteriostatic. It has been found to kill algae and fungi. The filter material controls bacterial growth in the unit 10. The copper-zinc alloy filter material 30 or 32 also reduces the amount of lead, cadmium and other inorganic compounds in the water, in addition to removing the chlorine. A filter having the dimensions mentioned above is capable of treating fifteen thousand gallons of water or more. Consequently, it is ideally suitable for use as an end point filter in a shower.

In either of the embodiments of FIGS. 2 and 4, it is possible that, for some water supplies, sufficient particle sediment can be lodged on the screen 26 (embodiment of FIG. 2) or in the filter material adjacent the end of the opening 16 (embodiment of FIG. 4) to significantly restrict water flow through the unit 10 long prior to depletion of the filter material 30 or 32. An adapter can be threaded onto the projection 20, with internal threads corresponding to the internal threaded portion 16 extending from it, to permit reversal of the unit 10 on the end of the pipe 15 for the purpose of back flushing the filter to remove such particles. The manner of operation of the filter unit 10, however, which has been described, is not dependent upon inclusion of such a back flushing feature.

The foregoing description of the preferred embodiments of the invention should be considered as illustrative only, and not as limiting. Various changes and modifications will occur to those skilled in the art without departing from the true scope of the invention, as defined in the appended claims. For example, other filter materials may be employed; and the size and structural configuration of the unit may be varied.

I claim:

1. A dechlorinator for attachment between a water supply pipe and a shower head including in combination:

a housing unit having first and second ends;

first and second end caps for closing the first and second ends, respectively, of said housing unit;

first means on said first end cap for attachment to a water supply pipe;

second means on said second end cap for attachment to a shower head to deliver water from said housing unit to the shower head after passing therethrough from said first means on said first end cap;

chlorine removal filter material of granulated copper-zinc alloy in said housing between said first and second end caps;

a first screen attached in an opening in said first end cap; and a second screen attached in an opening in said second end cap for retaining said granulated filter material in said housing unit, said first and second screens having a mesh size selected to permit sediment particles in the water to pass therethrough.

2. The combination according to claim 1 wherein said housing unit is a hollow cylinder, and said first and second end caps are substantially circular end caps, each having a diameter sufficient to close the first and second ends, respectively, of said hollow cylinder.

3. The combination according to claim 2 wherein said first means on said first end cap is located substantially at the center of said first end cap, and said second means on said second end cap is located substantially at the center of said second end cap.

4. The combination according to claim 3 wherein said first means comprises an internally threaded opening through said first end cap.

5. The combination according to claim 4 wherein said second means comprises an externally threaded hollow projection extending beyond said second end cap.

6. The combination according to claim 5 wherein said filter material substantially fills said housing unit between said first and second end caps.

7. The combination according to claim 1 wherein said first means comprises an internally threaded opening through said first end cap.

8. The combination according to claim 1 wherein said second means comprises an externally threaded hollow projection extending beyond said second end cap.

9. The combination according to claim 8 wherein said first means on said first end cap is located substantially at the center of said first end cap, and said second means on said second end cap is located substantially at the center of said second end cap.

10. The combination according to claim 1 wherein said filter material substantially fills said housing unit between said first and second end caps.

11. A dechlorinator for attachment between a water supply pipe and a shower head including in combination:

a housing unit having first and second ends;

first and second end caps for closing the first and second ends, respectively, of said housing unit;

first means on said first end cap for attachment to a water supply pipe;

second means on said second end cap for attachment to a shower head to deliver water from said housing unit to the shower head after the water passes through said housing unit from said first means on said first end cap; and chlorine removal filter material in the form of randomly oriented elongated fine metallic fibers of a copper-zinc alloy substantially filling said housing unit for chemically combining with chlorine.

12. The combination according to claim 11 wherein said housing unit is a hollow cylinder, and said first and second end caps are substantially circular end caps, each having a diameter sufficient to close the first and second ends, respectively, of said hollow cylinder.

13. The combination according to claim 12 wherein said first means on said first end cap is located substantially at the center of said first end cap, and said second means on said second end cap is located substantially at the center of said second end cap.

14. The combination according to claim 13 wherein said first means comprises an internally threaded opening through said first end cap.

15. The combination according to claim 14 wherein said second means comprises an externally threaded hollow projection extending beyond said second end cap.

* * * * *